United States Patent
Kanaan et al.

(10) Patent No.: US 6,640,089 B1
(45) Date of Patent: Oct. 28, 2003

(54) SYSTEM AND METHOD FOR ADAPTIVELY PREDICTING RADIO WAVE PROPAGATION

(75) Inventors: Muzaffer Kanaan, Brighton, MA (US); Pablo A. Vicharelli, Carlisle, MA (US); Pete A. Boyer, Somerville, MA (US)

(73) Assignee: Verizon Laboratories Inc., Waltham, MA (US)

( * ) Notice: Subject to any disclaimer, the term of this patent is extended or adjusted under 35 U.S.C. 154(b) by 520 days.

(21) Appl. No.: 09/711,722

(22) Filed: Nov. 13, 2000

(51) Int. Cl.[7] ............................................. H04B 17/00
(52) U.S. Cl. ............................ 455/67.16; 455/67.11; 702/127
(58) Field of Search ..................... 455/66.3, 67.16, 455/67.11, 422.1, 423, 446, 447, 524, 561, 449, 456; 342/359, 360; 702/127, 159; 324/326, 532, 335

(56) References Cited

U.S. PATENT DOCUMENTS

| | | | |
|---|---|---|---|
| 5,301,127 A | 4/1994 | Hitney | 364/525 |
| 5,574,466 A | 11/1996 | Reed et al. | 342/359 |
| 5,623,429 A * | 4/1997 | Fortune et al. | 703/3 |
| 5,689,812 A | 11/1997 | Takahashi | 455/67.6 |
| 5,710,758 A | 1/1998 | Soliman et al. | 370/241 |
| 5,953,669 A | 9/1999 | Stratis et al. | 455/449 |
| 6,052,583 A * | 4/2000 | Bernardin | 455/423 |
| 6,298,035 B1 * | 10/2001 | Heiskala | 370/206 |
| 6,330,439 B1 * | 12/2001 | Shin et al. | 455/423 |
| 6,341,223 B1 * | 1/2002 | Park | 455/446 |
| 6,487,417 B1 * | 11/2002 | Rossoni et al. | 455/67.16 |

FOREIGN PATENT DOCUMENTS

WO     WO 9827770 A2 *  6/1998 ............ H04Q/7/36

OTHER PUBLICATIONS

Manuel F. Catedra and Jesus Perez–Arriaga *Cell Planning For Wireless Communications* Chapter 4 "Empirical and Semiempirical Path Loss Models" pp. 109–133 1999.
*TIA/EIA Telecommunications Systems Bulletin* "Wireless Communications Systems—Performance in Noise and Interference–Limited Situations—Recommended Methods for Technology–Independent Modeling, Simulation, and Verification" pp. 29–58 Jan. 1998.
Romulo Augusto N. de Oliveira "Ray Tracing Model For Mobile Systems In A Forested Environment" 2nd IEEE Abstract Aug. 1998 pp. 306–311.
Kurt Tutschku and Kenji Leibnitz "Fast Ray–Tracing for Field Strength Prediction in Cellular Mobile Network Planning" IEEE Abstract May 1996 pp. 541–545.
John W. McKown and R. Lee Hamilton, Jr. *IEEE Network Magazine* "Ray Tracing as a Design Tool for Radio Networks" Nov. 1991 pp. 27–30.

* cited by examiner

*Primary Examiner*—William Trost
*Assistant Examiner*—Congvan Tran
(74) *Attorney, Agent, or Firm*—Leonard Charles Suchyta; James K. Weixel

(57) ABSTRACT

A computing system (36) provides a network designer with a mechanism for adaptively predicting the propagation of a radio wave (22) along radials (24) emanating from a base station (26) in a wireless communication environment (20). The computing system (36) includes executable code in the form of a propagation prediction process (58, 130). The propagation prediction process (58, 130) selects segments (78) of a selected one of the radials (24) on a per segment basis and ascertains a propagation environment (28, 30, 32, 34) through which the selected segment (78) traverses. The process (58, 130) chooses, in response to a switching parameter (88, 90, 92), a propagation model (62, 64, 66, 68) from a collection of propagation models (60) that is best suited for predicting the propagation of the radio wave (22) at the selected segment (78).

20 Claims, 8 Drawing Sheets

SYSTEM AND METHOD FOR ADAPTIVELY PREDICTING RADIO WAVE PROPAGATION

TECHNICAL FIELD OF THE INVENTION

The present invention relates to predicting radio wave propagation in a wireless communication environment. More specifically, the present invention relates to adaptively predicting radio wave propagation through a radio communication environment exhibiting heterogeneous propagation.

BACKGROUND OF THE INVENTION

The planning and optimization of wireless communication networks results in the need for propagation models that accurately characterize the propagation of radio frequency signals in a given environment. Predictions of radio frequency signal, or radio wave, propagation are used to estimate quantities such as coverage, serving areas, interference, and so forth. These quantities, in turn, are used to arrive at equipment settings, for example, channel assignments, whose goal is to optimize capacity without sacrificing the quality of the network. Accordingly, it is highly desirable to employ a propagation model that is as accurate and reliable as possible, given the geographical data used as an input to the propagation model.

A conventional approach to propagation modeling is to employ a basic analytic model designed to determine the power received by a mobile station in terms of the power transmitted by a base station, the base station antenna gain, and the mobile station antenna gain. Once the transmitted power and the two antennas are selected, the propagation model reduces to evaluating the path loss of the radio frequency signal. Thus, it is highly desirable to compute the path loss as accurately as possible.

In general, path loss is the decrease, or attenuation, of the power of a signal usually occurring as a result of absorption, reflection, diffusion, scattering, diffraction, or dispersion, from an original level. In a wireless communication network, path loss may be determined from several components. For example, path loss may be a combination of distance dependent path loss, path loss due to terrain obstacles, path gain (or loss) due to sloping terrain, path gain caused by over-water propagation enhancement, path loss due to rain attenuation, and/or path loss due to street orientation relative to the propagation path.

There are several known models for predicting radio wave propagation. The selection of which propagation model to employ depends in large part on the land use and land cover (i.e., the propagation environment) because the particular propagation environment can affect the path loss of the radio wave. Some propagation environments include, for example, urban/suburban, rural agricultural, rangeland, forest land, water, wetland, barren land, tundra, perennial snow or ice, and so forth.

One conventional empirical propagation model typically used in radio engineering is a one slope approximation model, such as the known Okumura-Hata model. The one slope approximation model is an empirically-based formula for propagation loss derived from measured data obtained in Tokyo, Japan at particular frequencies. The Okumura-Hata model provides rapid calculation of path loss for line of sight conditions using terrain and land usage data. The Okumura-Hata model is applicable in a clutter-based propagation environment, such as urban/suburban or some rural propagation environments, in which the mobile station is located in the clutter.

Another technique for modeling radio wave propagation is the two slope approximation, also known as the two-ray model. In two-ray models, path loss at the receiver is predicted by considering only the contribution of a direct ray and a ground reflected ray of the radio frequency signal. Two-ray models are employed when the terrain is sufficiently smooth such that the terrain can be approximated by a flat-earth model. The two-ray model is applicable to flat-earth propagation environments, such as over water or barren land propagation environments.

Yet another technique for modeling radio wave propagation involves ray tracing. Ray tracing models attempt to model the propagation of radio frequency signals as rays radiating from the transmitter to the receiver. Ray tracing models are especially suited for predicting radio wave propagation in cluttered environments, such as in dense urban areas containing many tall buildings, in which a radio wave propagates along multiple propagation paths, i.e., multipaths.

Typically, network planning tools predict radio wave propagation by employing a single propagation model that predicts radio wave propagation throughout the entire wireless communication network. Alternatively, network planning tools may predict radio wave propagation by employing a single propagation model to predict radio wave propagation throughout a particular cell, or to predict radio wave propagation throughout a sector of a cell.

Unfortunately, if the propagation environment changes within the sector, a propagation model used for modeling radio wave propagation in that sector would no longer be an accurate predictor of radio wave propagation in that sector. Thus, what is needed is a method and system for making available to a network designer a propagation model suited to predicting radio wave propagation at a location within a sector.

SUMMARY OF THE INVENTION

Accordingly, it is an advantage of the present invention that a method and system are provided for predicting radio wave propagation.

It is another advantage of the present invention that the system and method predict radio wave propagation along radials emanating from a base station.

It is yet another advantage of the present invention that the system and method choose a particular propagation model for predicting radio wave propagation in response to a propagation environment at locations along the radials.

The above and other advantages of the present invention are carried out in one form by a computer-based method for predicting radio wave propagation along a radial emanating from a base station. The method calls for selecting one segment from a plurality of segments describing the radial and ascertaining a propagation environment through which the one segment traverses. The propagation environment is one of a first propagation environment and a second propagation environment. The method further calls for obtaining a switching parameter relative to the second propagation environment. A first propagation model is utilized to predict radio wave propagation at the one segment when the switching parameter fails to exceed a threshold, and a second propagation model is employed to predict the radio wave propagation at the one segment when the switching parameter exceeds the threshold.

The above and other advantages of the present invention are carried out in another form by a computing system for predicting radio wave propagation from a base station. The computing system includes a processor and a computer-readable storage medium. Executable code is recorded on the computer-readable storage medium for instructing the processor to perform operations including defining a plurality of radials emanating from the base station. The operations further include, for each of the radials, selecting one segment from a plurality of segments describing the radial, ascertaining a propagation environment through which the one segment traverses, the propagation environment being one of a clutter-based environment and a flat-earth environment, and obtaining a switching parameter relative to the flat-earth environment. The executable code further instructs the processor to perform operations including utilizing a clutter-based land propagation model to predict radio wave propagation at the one segment when the switching parameter fails to exceed a threshold, and to employ a flat-earth propagation model to predict radio wave propagation at the one segment when the switching parameter exceeds the threshold.

The above and other advantages of the present invention are carried out in yet another form by a computer-readable storage medium containing executable code for instructing a processor to choose one of a first propagation model and a second propagation model for predicting radio wave propagation along a radial emanating from a base station. The executable code instructs the processor to perform operations that include selecting one segment from a plurality of segments describing the radial and ascertaining a propagation environment through which the one segment traverses. The propagation environment is one of a first propagation environment and a second propagation environment. The executable code instructs the processor to perform further operations that include defining a threshold at which the second propagation environment exerts a greater influence on radio wave propagation than the first propagation environment, obtaining a switching parameter relative to the second propagation environment, choosing the first propagation model to predict radio wave propagation at the one segment when the switching parameter fails to exceed the threshold, and choosing the second propagation model to predict radio wave propagation at the one segment when the switching parameter exceeds the threshold.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
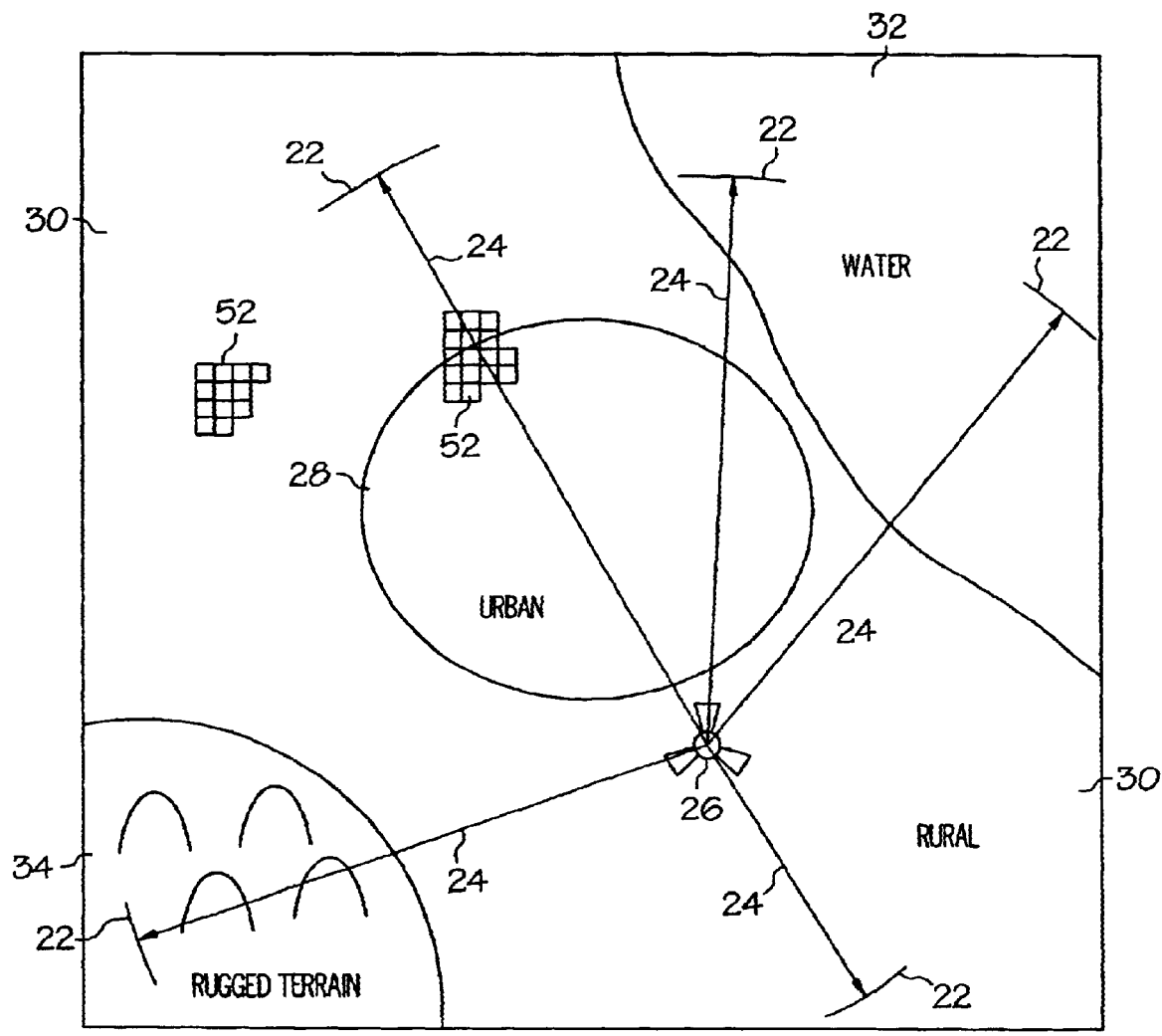
FIG. 1 shows a simplified block diagram of an exemplary wireless communication environment in which a radio wave is propagating along radials emanating from the base station through the environment.

FIG. 1 shows a simplified block diagram of an exemplary wireless communication environment 20 in which a radio wave 22, represented as a wavefront, is propagating along radials 24 emanating from a base station 26 through environment 20. Environment 20 includes a number of greatly varying propagation environments defined by land use categories, such as an urban environment 28, a rural environment 30, a water environment 32, and a rugged terrain environment 34. As radio wave 22 traverses through these propagation environments, changes in the propagation environment may give rise to changes in the propagation of radio wave 22. The present invention accommodates these sudden changes in environment 20 by making available to a network designer a propagation model suited to predicting propagation of radio wave 22 at discrete intervals along radials 24.

Environment 20 is shown with only one base station 26 for clarity of illustration. However, it should be understood that base station 26 is one of a number of base stations forming a wireless communication network. In addition, only a few of radials 24 are shown for clarity of illustration. The number of radials 24 to be analyzed depends upon a predetermined angular separation between radials 24, as will be discussed below.

Figure 2:
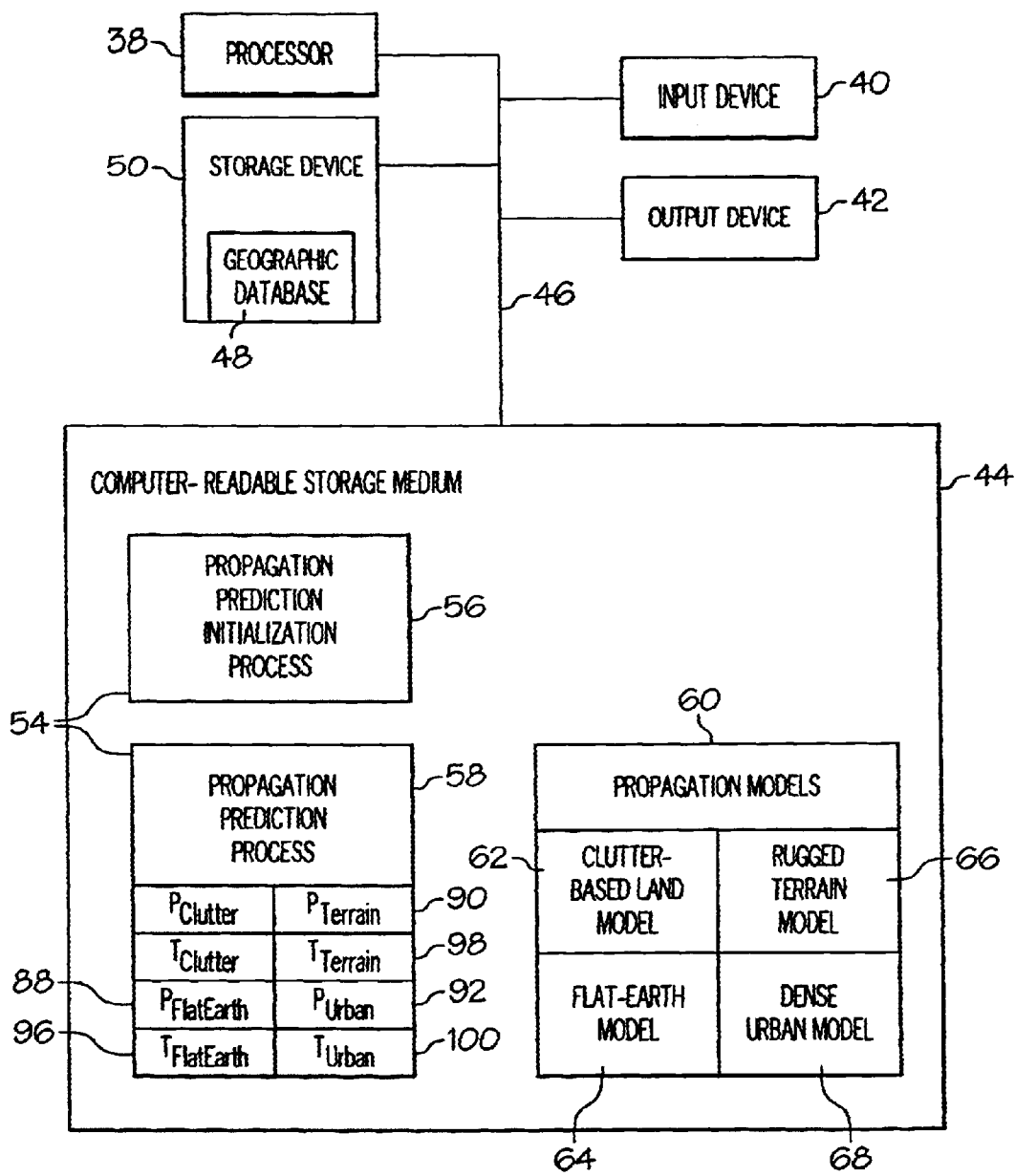
FIG. 2 shows a simplified block diagram of a computing system for predicting radio wave propagation along the radials emanating from the base station of FIG. 1.

FIG. 2 shows a simplified block diagram of a computing system 36 for predicting radio wave propagation along radials 24 (FIG. 1) emanating from base station 26 (FIG. 1). System 36 includes a processor 38 on which the methods according to the invention can be practiced. Processor 38 is in communication with an input device 40, an output device 42, and a computer-readable storage medium 44. These elements are interconnected by a bus structure 46.

Processor 38 includes a data reader (not shown) for reading data, such as a geographic database 48, from a storage device 50. Referring momentarily to FIG. 1, environment 20 is subdivided into a plurality of locations 52, of which only a few are shown. Locations 52 are the basic units that make up environment 20 and represent the smallest area of interest, i.e. a location, in an actual environment represented by environment 20. For example, each of locations 52 may represent a region in an actual environment having a fixed area (e.g., one hundred meters by one hundred meters). The actual size of the location is a tradeoff between accuracy (more locations, or higher resolution) and increased processing speed (fewer locations, or reduced resolution).

Referring back to computing system 36 (FIG. 2), database 48 includes data describing the propagation environments, such as urban environment 28, rural environment 30, water environment 32, and rugged terrain environment 34 of wireless communication environment 20 at discrete locations 52 (FIG. 1) within environment 20. The data reader may include a hard disk drive internal or external to processor 38, a tape drive, floppy disk drive, CD-ROM, or a combination thereof for reading geographic database 48 from storage device 50. Storage device 50 may be a hard disk, floppy disk, a compact disk, a personal computer memory card international association (PCMCIA) card, and the like.

Input device 40 can encompass a keyboard, mouse, pointing device, audio device (e.g., a microphone), or any other device providing input to processor 38. Output device 42 can encompass a display, a printer, an audio device (e.g., a speaker), or other devices providing output from processor 38. Input and output devices 40 and 42 can also include network connections, modems, or other devices used for communications with other computer systems or devices.

Computer-readable storage medium 44 may be a hard disk drive internal or external to processor 38, a magnetic disk, compact disk, or any other volatile or non-volatile mass storage system readable by processor 38. Computer-readable storage medium 44 may also include cooperating or interconnected computer readable media, which exist exclusively on computing system 36 or are distributed among multiple interconnected computer systems (not shown) that may be local or remote.

Executable code 54 is recorded on computer-readable storage medium 44 and implemented in a network planning tool for instructing processor 38 to predict the propagation of radio wave 22 (FIG. 1) at discrete intervals along radials 24 (FIG. 1) emanating from base station 26 (FIG. 1) of environment 20 (FIG. 1). Executable code 54 is executed by processor 38 to choose a particular propagation model suited to one of the propagation environments, such as such as urban environment 28, rural environment 30, water environment 32, and rugged terrain environment 34 to predict at a discrete interval the propagation, or path loss, of radio wave 22 as it propagates from base station 26 in response to the receipt of data from geographic database 48.

Executable code 54 includes a propagation prediction initialization process 56 and a propagation prediction process 58 recorded on computer-readable storage medium 44. In addition, a number of propagation models 60, such as a clutter-based land model 62, a flat-earth model 64, a rugged terrain model 66, and a dense urban model 68, are recorded on computer-readabale storage medium.

Propagation prediction initialization process 56 includes program code for defining radials 24 (FIG. 1) emanating from base station 26 (FIG. 1) and for selecting particular ones of propagation models 60 to be employed during the execution of propagation prediction process 58. Propagation prediction process 58 includes program code for choosing one of propagation models 60 in response to predetermined switching thresholds (discussed below) for predicting propagation of radio wave 22 (FIG. 1) at discrete intervals along radials 24 (FIG. 1).

Figure 3:
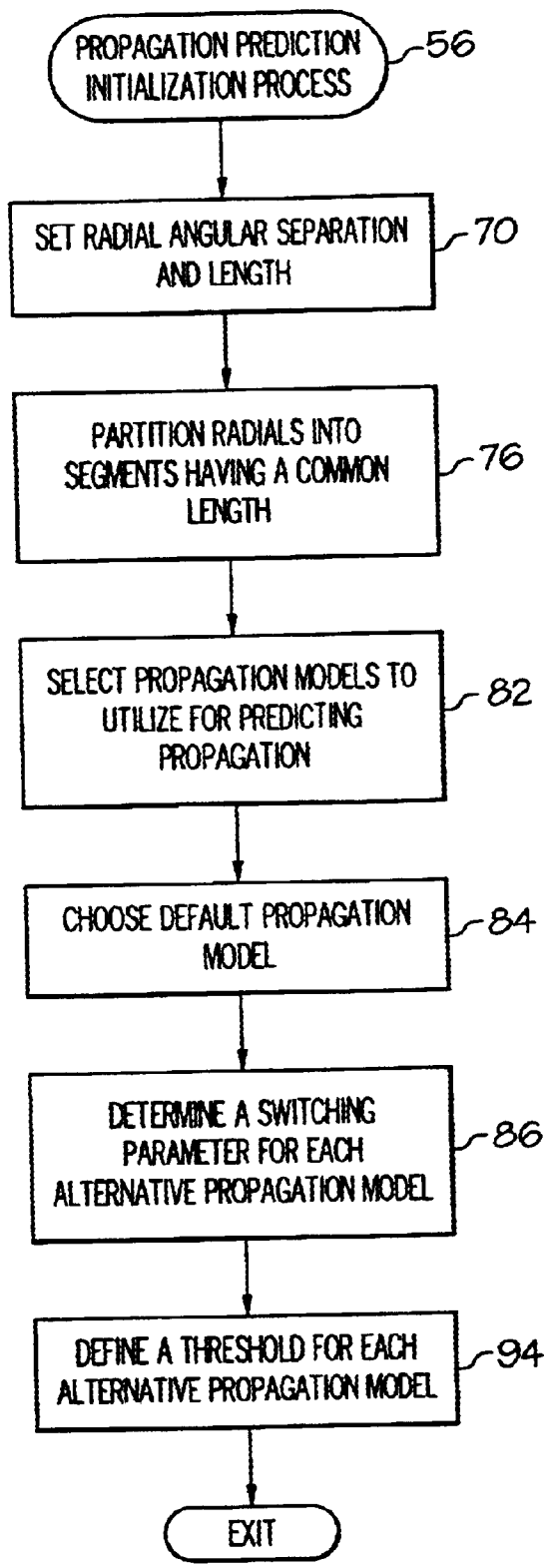
FIG. 3 shows a flow chart of a propagation prediction initialization process.

FIG. 3 shows a flow chart of propagation prediction initialization process 56. Propagation prediction initialization process 56 is executed by processor 38 (FIG. 2) to define radials 24 (FIG. 1) and to select particular ones of propagation models 60 to be employed during the execution of propagation prediction process 58. Processor 38 may define radials 24 and select propagation models 60 according to some predefined criteria. Alternatively, process 56 may be performed interactively using a series of prompts, or questions, posed through the execution of process 56 to a network designer to define radials 24 (FIG. 1) and to select propagation models 60. Process 56 begins with a task 70.

At task 70, processor 38 sets an angular separation between radials 24 (FIG. 1) and a length of radials 24. Propagation prediction process 58 (FIG. 2) is performed for each of radials 24. The angular separation between radials 24 establishes the number of radials 24 to be analyzed, hence the number of iterations of process 58. The angular separation between radials 24 is a tradeoff between accuracy (smaller angular separation, or higher resolution) and increased processing speed (larger angular separation, or reduced resolution). In an exemplary embodiment, radials 24 may be separated by one tenth to a few degrees of angular separation.

Figure 4:
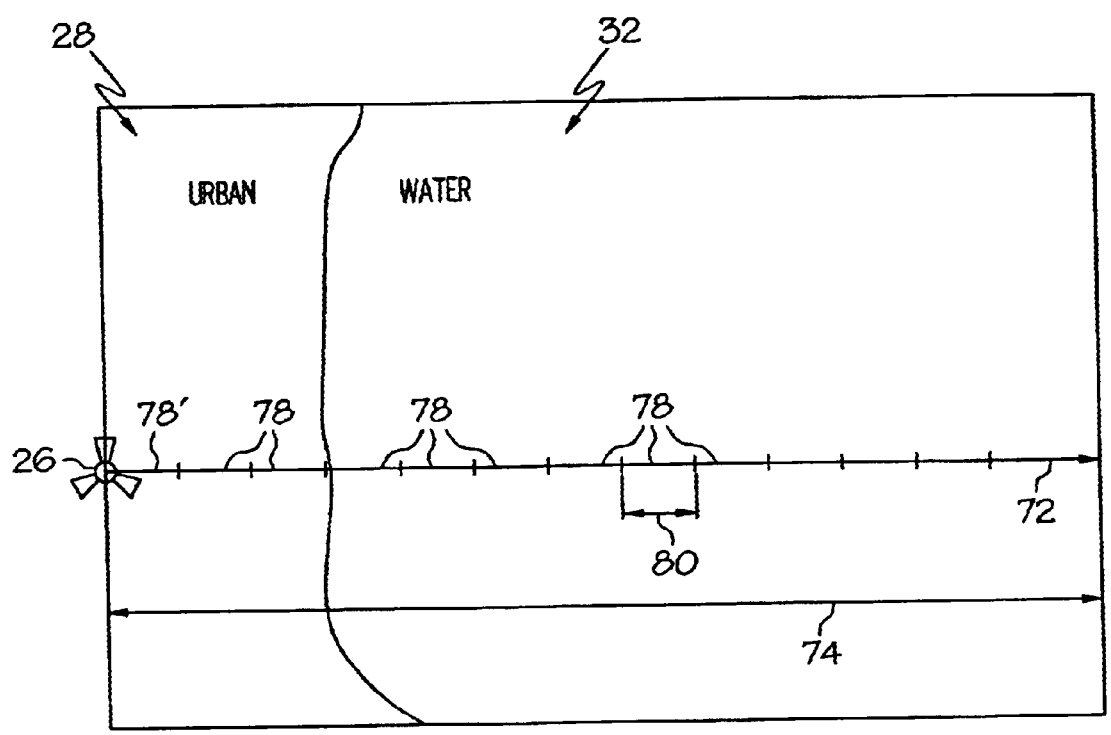
FIG. 4 shows a block diagram of a first radial emanating from the base station of FIG. 1 and traversing a clutter-based environment and a flat-earth environment.

Referring to FIG. 4 in connection with task 70, FIG. 4 shows a block diagram of a first one of radials 24 (FIG. 1), i.e., a first radial 72, emanating from base station 26 and traversing a clutter-based environment, i.e., urban environment 28, and a flat-earth environment, i.e., water environment 32. In addition to the angular separation, task 70 establishes a length 74 of radials 24, as shown in connection with first radial 72. Length 74 of radials 24 may be an estimate of the distance through environment 20 over which radio wave 22 (FIG. 1) may propagate.

With reference back to propagation prediction initialization process 56 (FIG. 3), following task 70, program control proceeds to a task 76. At task 76, processor 38 (FIG. 2) partitions radials 24 into segments having a common length. Again referring to FIG. 4, first radial 72 is shown partitioned into a number of segments 78, each of segments 78 having a common length 80. Propagation prediction process 58 (FIG. 2) is performed for each of segments 78 in a consecutive order from base station 26 (FIG. 1). Common length 80 establishes the number of segments 78 to be analyzed, thus influencing the computational burden of process 58. Like the angular separation, common length 80 is a tradeoff between accuracy (shorter length 80, or higher resolution) and increased processing speed (longer length 80, or reduced resolution). In an exemplary embodiment, common length 80 of segments 78 may be approximately one hundred meters, that is the length of a side of one of locations 52 (FIG. 1).

Referring back to propagation prediction initialization process 56 (FIG. 3) following task 76, program control proceeds to a task 82. At task 82, processor 38 selects ones of propagation models 60 (FIG. 2) to utilize in propagation prediction process 58 for predicting the propagation of radio wave 22. Propagation prediction process 58 may employ any of a number of propagation models 60 for prediction propagation of radio wave 22. Through the execution of task 82 some of propagation models 60 are selected that may be best suited to the propagation environments of environment 20.

In an exemplary embodiment, clutter-based land model 62 (FIG. 2) may be a one slope approximation model, such as the known Okumura-Hata model. Flat-earth model 64 (FIG. 2) may be a conventional two-ray model. Rugged terrain model 66 (FIG. 2) may utilize an inverse square law model for unobstructed line-of-sight. The inverse square law defines the power per unit area in the direction of propagation of a spherical wavefront as varying inversely as the square of the distance from the source. Dense urban model 68 (FIG. 2) may be a ray tracing model that models the propagation of radio wave 22 as rays radiating from base station 26 to one of locations 52 (FIG. 1).

Models 62, 64, 66, and 68 are being described in terms of some particular, known, propagation modeling techniques for clarity of illustration. However, it should be understood that any of a number of known or evolving propagation modeling techniques may be selected at task 82 and utilized during the execution of propagation prediction process 58 (FIG. 2).

The number of propagation models 60 (FIG. 2) selected at task 82 determines the complexity, hence computing time and cost, associated with executing propagation prediction process 58. Accordingly, in a preferred embodiment selection task 82 may select only two or three of propagation models 60 that may be best suited to represent the propagation environments within environment 20 (FIG. 1). For example, the execution of task 82 may result in the selection of a first propagation model, such as clutter-based land model .62, and a second propagation model, such as flat-earth model 64.

Following task 82, a task 84 is performed. At task 84, processor 38 (FIG. 2) chooses one of the selected propagation models 60 (FIG. 2) to be a default propagation model. That is, processor 38 determines which of the propagation environments, such as urban environment 28, rural environment 30, water environment 32, and rugged terrain environment 34 (FIG. 1) is most likely to be prevalent within the region served by base station 26 (FIG. 1). The prevalent one of the land use categories drives the selection of a default propagation model from propagation models 60 selected at task 82.

By way of example, the execution of task 84 may result in clutter-based land model 62, such as the Okumura-Hata model, being chosen as the default propagation model. As such, flat-earth model 64, such as the two-ray model, becomes an alternative propagation model. In other words, during the execution of propagation prediction process 58 (FIG. 2), clutter-based land model 62 will be utilized to predict propagation of radio wave 22 (FIG. 1), unless a determination is made that flat-earth model 64 should be employed to predict the propagation of radio wave 22 (discussed below).

Following task 84, a task 86 is performed. At task 86, processor 38 (FIG. 2) determines a switching parameter for each alternative propagation model. The determination of switching parameters at task 86 provides quantifiable criteria, or metrics, for switching from a default propagation model, such as clutter-based land model 62, and an alternative propagation model, such as flat-earth model 64, for predicting the propagation of radio wave 22 (FIG. 1) emanating along radials 24 (FIG. 2).

In an exemplary scenario, when flat-earth model 64 (FIG. 2) is an alternative propagation model, a flat-earth switching parameter, $P_{FlatEarth}$, 88 (see FIG. 2) may be a number of segments 78 (FIG. 4) relative to a total number of segments 78 analyzed thus far that traverse water environment 32 (FIG. 1) along a selected one of radials 24 (FIG. 1).

Figure 5:
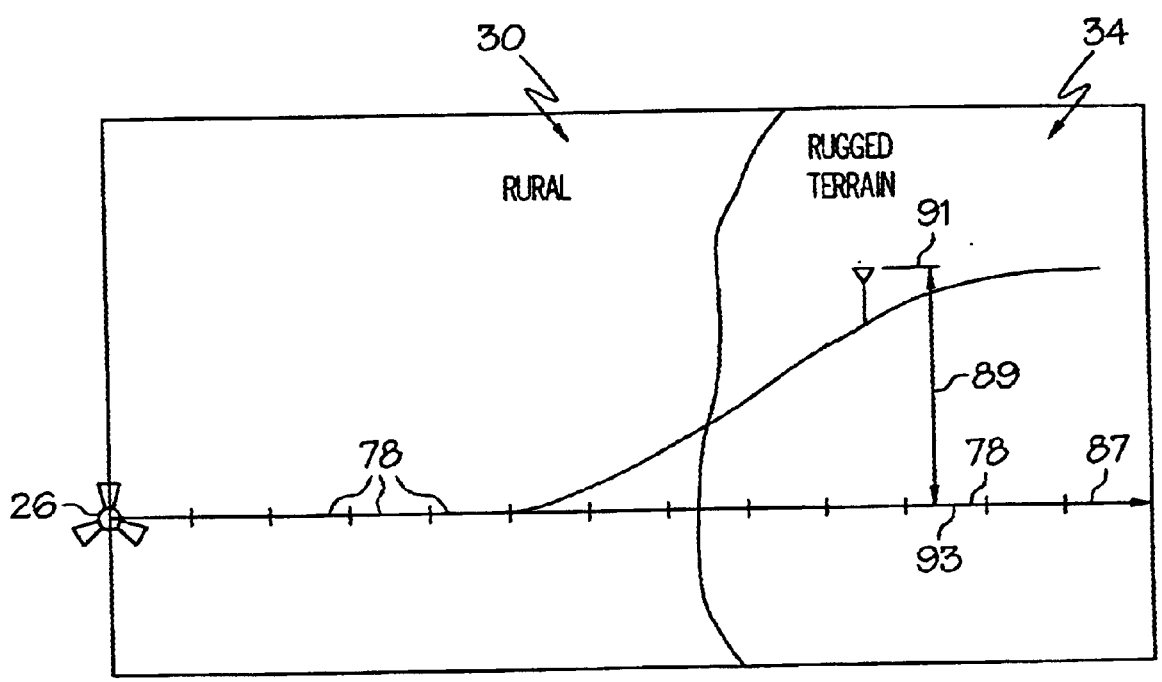
FIG. 5 shows a block diagram of a second radial emanating from the base station of FIG. 1 and traversing a rural environment and a rugged terrain environment.

Referring to FIG. 5 in connection with task 86, FIG. 5 shows a block diagram of a second one of radials 24 (FIG. 1), i.e., a second radial 87, emanating from base station 26 and traversing a flat-earth environment, such as rural environment 30, and a rugged terrain environment 34. In another exemplary scenario, when rugged terrain model 66 (FIG. 2) is an alternative propagation model, a rugged terrain switching parameter, $P_{Terrain}$, 90 (see FIG. 2) may be an effective antenna height value 89, or the difference between an antenna height 91 at one of segments 78 (FIG. 4) and an antenna height 93 of base station 26.

In yet another exemplary scenario (not shown), a dense urban switching parameter, $P_{Urban}$, 92 may be an effective antenna height value, or the difference between the height of an antenna (not shown) at one of segments 78 at ground level and average height of the obstructions within a dense urban environment.

With reference back to FIG. 3, a task 94 is performed in cooperation with determining task 86. At task 94, processor 38 (FIG. 2) defines switching thresholds for each alternative propagation model. The switching thresholds are values at which the propagation environment associated with an alternative propagation model exerts a greater influence on the propagation of radio wave 22 (FIG. 1) emanating along one of radials 24 than a propagation environment associated with the default propagation model. Thus, the definition of thresholds at task 94 provides minimum values over which the switching parameters are to exceed in order to enable switching from a default propagation model, such as clutter-based land model 62, to an alternative propagation model, such as flat-earth model 64, for predicting the propagation of radio wave 22 (FIG. 1) emanating along radials 24 (FIG. 2).

For example, a flat-earth switching threshold, TFlatEarth, 96 (see FIG. 2) may be a minimum percentage value of segments 78 (FIG. 4) relative to a total number of segments 78 analyzed thus far that traverse water environment 32 (FIG. 1) along one of radials 24. Likewise, a rugged terrain switching threshold, $T_{Terrain}$, 98 (see FIG. 2) may be a minimum effective antenna height value, and a dense urban switching threshold, Turban, 100 (see FIG. 2) may be the number of segments along a radial that are identified as dense urban relative to the total number of segments analyzed thus far.

Following task 94, propagation prediction initialization process 56 exits having defined an angular separation between radials 24 (FIG. 2), length 74 (FIG. 4) of radials 24, and common length 80 (FIG. 4) of segments 78 (FIG. 4). In addition, process 56 exits having selected at least two of propagation models 60 (FIG. 2) that may be chosen during the execution of propagation prediction process 58 (FIG. 2), determined their associated switching parameters, and defined their associated switching thresholds.

Figure 6:
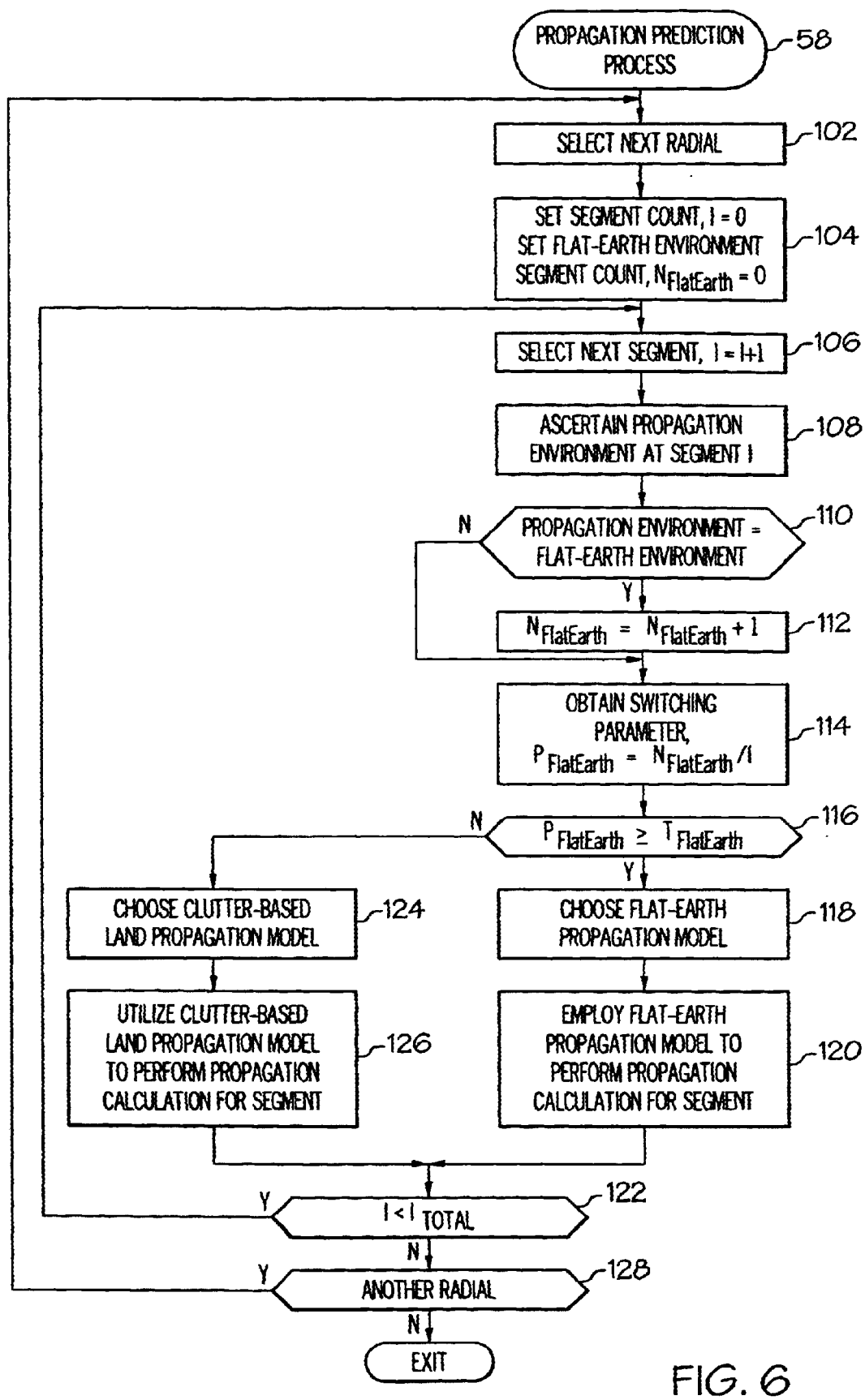
FIG. 6 shows a flow chart of a propagation prediction process.

FIG. 6 shows a flow chart of a propagation prediction process 58. Propagation prediction process 58 is executed by processor 38 to choose a particular one of propagation models 60 (FIG. 2) selected through the execution of initialization process 56 (FIG. 3) to predict propagation of radio wave 22 (FIG. 1) as it propagates from base station 26 (FIG. 1). In order to clearly illustrate the execution of process 58, clutter-based land model 62 was chosen in task 84 (FIG. 3) of initialization process 56 (FIG. 3) as the default propagation model, and flat-earth model 64 is the alternative propagation model. Process 58 begins with a task 102.

At task 102, processor 38 selects a next one of radials 24 (FIG. 1). As discussed previously, process 58 is performed for each of radials 24 defined through the execution of task 70 (FIG. 3) of initialization process 56 (FIG. 3). Hence, task 102 initiates the iterative methodology of propagation prediction process 58 on a per radial basis by the selection of one of radials 24. Of course, during a first iteration of process 58, processor 38 will select a first one of radials 24. By way of illustration, task 102 selects first radial 72 (FIG. 4) emanating from base station 26 (FIG. 4) and traversing a clutter-based land environment, i.e., urban environment 28, and a flat-earth environment, i.e., water environment 32.

Following task 102, a task 104 is performed. At task 104, processor 38 sets a segment count for first radial 72 to zero (I=0). In addition, task 104 sets a segment count related to the number of segments 78 (FIG. 4) through which first radial 72 traverses water environment 32 thus far to zero ($N_{FlatEarth}$=0).

Following task 104, program control proceeds to a task 106. At task 106, processor 38 selects a next one of segments 78 (FIG. 4) along first radial 72. In a preferred embodiment, propagation prediction process 58 is performed for each of segments 78 along first radial 72 in a consecutive segment order from base station 26. Accordingly, during a first iteration of task 106, the next segment selected is a first segment 78' (FIG. 4), that is, the one of segments 78 along first radial 72 closest to base station 26. In addition, task 106 increments by one the segment count, I, (I=I+1) in response to the selection of first segment 78' to obtain a summed total of segments 78 defining a length of first radial 72 evaluated thus far.

A task 108 is performed in response to task 106. At task 108, processor 38 (FIG. 2) accesses geographic database 48 (FIG. 2) to ascertain a propagation environment at first segment 78'. Processor 38 may access geographic database 48 by determining through, for example, latitude and longitude coordinates for one or more of locations 52 (FIG. 1) through which segment 78' traverses. A propagation environment, such as the aforementioned urban environment 28, rural environment 30, water 32, and rugged terrain 34 (FIG. 1) can thus be ascertained. Of course, one of locations 52 (FIG. 1) may include more than one of the propagation environments. Alternatively, first segment 78' may traverse more than one of locations 52. Accordingly, task 108 may ascertain the most prevalent of the land use categories to be the propagation environment through which first segment 78' traverses.

In response to ascertaining task 108, process 58 proceeds to a query task 110. At query task 110, processor 38 (FIG. 2) determines if the propagation environment through which first segment 78' traverses is a flat-earth environment, such as water environment 32. Thus, query task 110 is performed to identify a portion of segments 78 along the first radial 72 traversing water environment 32. When query task 110 determines that the propagation environment is water environment 32, process 58 proceeds to a task 112.

At task 112, processor 38 increments by one the segment count, $N_{FlatEarth}$, that is, the number of segments 78 (FIG. 4) of first radial 72 between base station 26 (FIG. 4) and including the selected one of segments 78 traversing a flat-earth environment, such as water environment 32. Following task 112, program control proceeds to a task 114.

However, when query task 110 determines that the selected one of segments 78, i.e., first segment 78', is not traversing a flat-earth environment, i.e., water environment 32, process 58 proceeds directly to task 114 without incrementing the value of $N_{FlatEarth}$.

At task 114, processor 38 (FIG. 2) obtains a switching parameter associated with the alternative propagation model. For example, as discussed above, flat-earth model 64 (FIG. 2) is the alternative propagation model. As such, the switching parameter, or flat-earth switching parameter 88, for flat-earth model 64 is a proportion of the length of first radial 72 evaluated thus far (i.e., the segment count, I) through which first radial 72 traverses water environment 32. Accordingly, at task 114, processor 38 obtains flat-earth switching parameter, $P_{FlatEarth}$, 88 by computing a ratio of the portion, ($N_{FlatEarth}$) of segments 78 traversing water 32 to the total segment count (I) evaluated thus far.

Of course, if task 112 was bypassed as a result of a negative response at query task 110, the value of flat-earth switching parameter, $P_{FlatEarth}$, 88 will decrease or be zero because the value of the portion, $N_{FlatEarth}$, will remain unchanged from a previous iteration of process 58 while the total segment count, I, will have increased by one.

Following task 114, process 58 proceeds to a query task 116. At query task 116, processor 38 determines if flat-earth switching parameter, $P_{FlatEarth}$, 88 exceeds flat-earth switching threshold, $T_{FlatEarth}$, 96 (FIG. 2). When flat-earth switching parameter 88 exceeds flat-earth switching threshold 96, program control proceeds to a task 118. Flat-earth switching threshold, $T_{FlatEarth}$, 96 is selected such that a statistically significant portion of first radial 72 will desirably traverse water environment 32 (FIG. 4) prior to switching propagation models. For example, flat-earth switching threshold 96 may be defined as being fifty percent. Such a value indicates that more than half of segments 78 analyzed thus far traverse water environment 32. In such a scenario, water environment 32 would exert a greater influence on the propagation of radio wave 22 (FIG. 1) at the selected one of segments 78 (FIG. 4) than urban environment 28 (FIG. 4).

At task 118, processor 38 chooses flat-earth propagation model 64 (FIG. 2) to predict propagation of radio wave 22 from base station 26 (FIG. 1) through the selected one of segments 78.

A task 120 is performed in response to task 118. At task 118, processor 38 employs flat-earth model 64 recorded on computer readable storage medium 44 (FIG. 2) to perform a propagation calculation for the selected one of segments 78. The product of the propagation calculation may be a received signal strength of radio wave 22 at the selected one of segments 78 using flat-earth model 64. Following task 120, a query task 122 is performed (discussed below).

Referring back to task 116, when processor 38 determines that flat-earth switching parameter, $P_{FlatEarth}$, 88 does not exceed flat-earth switching threshold, $T_{FlatEarth}$, 96 (FIG. 2) program control proceeds to a task 124.

At task 124, processor 38 chooses the default propagation model, i.e., clutter-based land model 62 (FIG. 2) to predict propagation of radio wave 22 from base station 26 (FIG. 1) through the selected one of segments 78.

Accordingly, a task 126 is performed in response to task 124. At task 126, processor 38 utilizes clutter-based land model 62 recorded on computer readable storage medium 44 (FIG. 2) to perform a propagation calculation for the selected one of segments 78. The product of the propagation calculation may be a received signal strength of radio wave 22 at the selected one of segments 78 using clutter-based land model 62. Following task 126, query task 122 is performed.

Query task 122 is performed following either of tasks 120 or 126 to determine if the segment count, I, associated with the selected one of segments 78 (FIG. 4) is less than a total number of segments, $I_{TOTAL}$, that form first radial 72 (FIG. 4). When processor 38 determines at query task 122 that the segment count, I, is less than the segment total, $I_{TOTAL}$, program control loops back to task 106 to select the next one of segments 78 and to perform a propagation calculation for the next consecutive one of segments 78 using one of clutter-based land model 62 and flat-earth model 64.

However, when processor 38 determines at query task 122 that the segment count, I, is not less than the total number of segments, $I_{TOTAL}$, process 58 proceeds to a query task 128. Accordingly, a negative response to query task 122 indicates that a propagation calculation was performed for each of segments 78 along the selected one of radials 24, i.e., first radial 72 (FIG. 4).

At query task 128, processor 38 (FIG. 2) determines if there is another one of radials 24 for which propagation prediction process 58 is to be performed. When there is another one of radials 24, program control loops back to task 102 to select the next one of radials 24, and perform propagation calculations for each of segments 78 defining the next one of radials 24 using one of clutter-based land model 62 and flat-earth model 64.

However, when query task 128 determines that there is not another one of radials 24, process 58 exits having performed propagation calculations on a segment by segment, and radial by radial basis, using propagation models best suited to the propagation environments through which each segment traverses.

Figure 7:
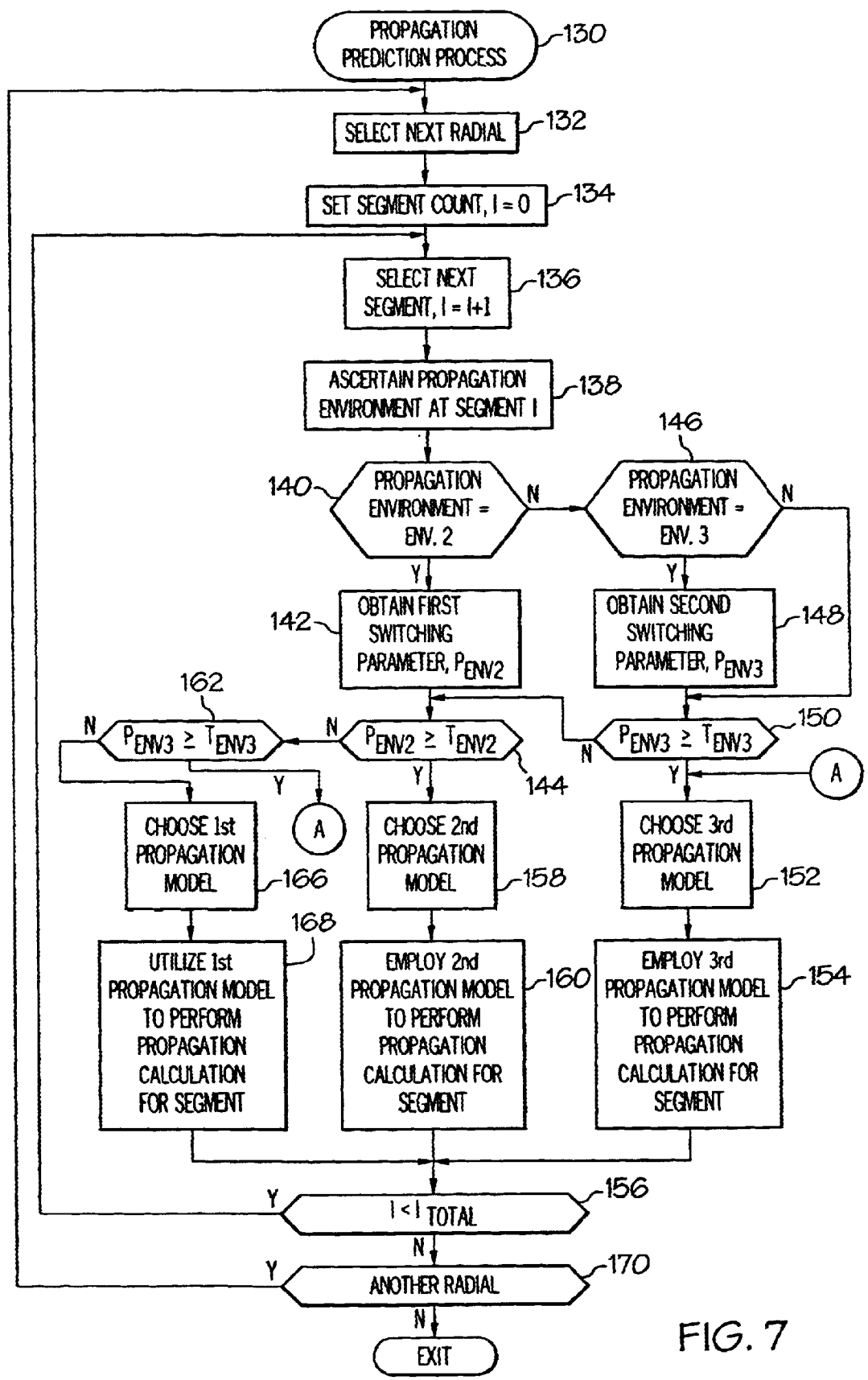
FIG. 7 shows a flow chart of a propagation prediction process in an alternative embodiment of the present invention.

FIG. 7 shows a flow chart of a propagation prediction process 130 in an alternative embodiment of the present invention. In particular, process 130 shows a generalized process for choosing one of three propagation models for performing a propagation calculation for a particular one of segments 78 (FIG. 5). Thus, propagation prediction process 130 is expanded from process 58 (FIG. 6) to include a third land use category or propagation environment. Process 130 begins with a task 132.

Task 132 is similar to task 102 (FIG. 6) of process 58 in that task 132 causes processor 38 to select a next one of radials 24 (FIG. 1).

Following task 132, a task 134 is performed. Task 134 is similar to task 104 (FIG. 6) of process 58 in that task 134 causes processor 38 to set a segment count for the selected one of radials 24 to zero (I=0). In addition, task 134 may also set a segment count related to a number of segments 78 (FIG. 4) through which the selected one of radials 24 traverses a flat-earth environment to zero ($N_{FlatEarth}=0$).

Following task 134, program control proceeds to a task 136. Again, task 136 is similar to task 106 (FIG. 6) of process 58. That is, at task 136, processor 38 selects a next one of segments 78 (FIG. 4) along the selected one of radials 24. In addition, task 136 increments by one the segment count, I, (I=I+1) to obtain a summed total of segments 78 defining a length of the selected one of radials 24 (FIG. 1) evaluated thus far in response to the selection of the next one of segments 78.

A task 138 is performed in response to task 136. At task 138, processor 38 (FIG. 2) accesses geographic database 48 (FIG. 2) to ascertain a propagation environment at the selected one of segments 78. Task 138 differs from task 108 (FIG. 6) of process 58 in that the propagation environment may be one of a first propagation environment, a second propagation environment, and a third propagation environment. For example, the first propagation environment may be a clutter-based propagation environment, such as urban environment 28 (FIG. 1). The second propagation environment may be a flat-earth propagation environment, such as rural environment 30 (FIG. 1) or water environment 32 (FIG. 1). Finally, the third environment may be a rugged terrain propagation environment, such as rugged terrain environment 34 (FIG. 1).

In response to ascertaining task 138, process 130 proceeds to a query task 140. At query task 140, processor 38 determines if the propagation environment through which the selected one of segments 78 (FIG. 4) traverses is the second environment (ENV.2), or a flat-earth environment, such as water environment 32. Thus, query task 140 is performed to identify a portion of segments 78 along the selected one of radials 24 traversing a flat-earth environment. When query task 140 determines that the propagation environment is a flat-earth environment, process 130 proceeds to a task 142.

At task 142, processor 38 obtains (or updates) a first switching parameter, $P_{ENV2}$, particular to the flat-earth environment. That is, at task 142, processor 142 increments by one the segment count, $N_{FlatEarth}$, that is, the number of segments 78 (FIG. 4) through which the selected one of radials 24 traverses a flat-earth environment, such as water environment 32, and computes the ratio of $N_{FlatEarth}$ to the total segment count, I, of segments 78 analyzed thus far to obtain flat-earth switching parameter, $P_{FlatEarth}$, 88, as discussed previously. Following task 142, program control proceeds to a task 144 (discussed below).

However, at query task 140, when processor 38 determines that the selected one of segments 78 is not traversing the second environment, or flat-earth environment, process 130 proceeds to a task 146.

At task 146, processor 38 determines if the propagation environment through which the selected one of segments 78 (FIG. 4) traverses is the third propagation environment (ENV.3), or rugged terrain environment 34. Thus, query task 146 is performed to identify those segments 78 along the selected one of radials 24 traversing rugged terrain. When query task 146 determines that the propagation environment is rugged terrain environment 34, process 130 proceeds to a task 148.

At task 148, processor 38 obtains (or updates) a second switching parameter, $P_{ENV3}$, particular to rugged terrain environment 34. For example, processor may determine effective antenna height 89 (FIG. 5) between antenna height 91 (FIG. 5) at the selected one of segments 78 (FIG. 5) and antenna height 93 (FIG. 5) of base station 26 to obtain rugged terrain switching parameter 90 (FIG. 2). Following task 148, program control proceeds to a query task 150. Likewise, when query task 150 determines that the propagation environment through which the selected one of segments 78 traverses is not the third environment, program control proceeds directly to query task 150 without having obtained (or updated) a second switching parameter, $P_{ENV3}$.

At query task 150, processor 138 determines if the second switching parameter, $P_{ENV3}$, exceeds a second switching threshold, $T_{ENV3}$, associated with the third propagation environment. For example, processor 38 may determine whether rugged terrain switching parameter 90 (FIG. 2) exceeds rugged terrain switching threshold 98 (FIG. 2). When the second switching parameter, $P_{ENV3}$, exceeds the second switching threshold, $T_{ENV3}$, program control proceeds to a task 152. That is, an affirmative response at task 150 indicates that the third propagation environment, i.e., rugged terrain environment 34, is exerting a greater influence on the propagation of radio wave 22 (FIG. 2) at the selected one of segments 78 than the first and second environments.

At task 152, processor 38 chooses a third propagation model, such as rugged terrain propagation model 66 (FIG. 2) to predict propagation of radio wave 22 from base station 26 (FIG. 1) through the selected one of segments 78.

A task 154 is performed in response to task 152. At task 154, processor 38 employs the third propagation model, i.e., rugged terrain propagation model 66, recorded on computer readable storage medium 44 (FIG. 2) to perform a propagation calculation for the selected one of segments 78. The product of the propagation calculation may be a received signal strength of radio wave 22 at the selected one of segments 78 using rugged terrain propagation model 66 (FIG. 2). Following task 154, a query task 156 is performed (discussed below).

Referring back to query task 150, when processor 38 determines that the second switching parameter, $P_{ENV3}$, does not exceed the second switching threshold, $T_{ENV3}$, program control loops back to query task 144. Likewise, as discussed previously, following the execution of task 142 program control proceeds to query task 144. At query task 144, processor 138 determines if the first switching parameter, $P_{ENV2}$, exceeds a first switching threshold, $T_{ENV2}$, associated with the second propagation environment. For example, processor 38 may determine whether flat-earth switching parameter 88 (FIG. 2) exceeds flat-earth switching threshold 96 (FIG. 2). When the first switching parameter, $P_{ENV2}$, exceeds the switching threshold, $T_{ENV2}$, program control proceeds to a task 158. That is, an affirmative response at task 144 indicates that the second propagation environment, i.e., water environment 32, is exerting a greater influence on the propagation of radio wave 22 (FIG. 2) at the selected one of segments 78 than the first and third environments.

Task 158 is similar to task 152 in that task 158 causes processor 38 to choose a second propagation model, such as flat-earth model 64 (FIG. 2) to predict propagation of radio wave 22 from base station 26 (FIG. 1) through the selected one of segments 78.

A task 160 is performed in response to task 158. Task 160 is similar to task 154 in that task 160 causes processor 38 to employ the second propagation model, i.e., flat-earth propagation model 64, recorded on computer readable storage medium 44 (FIG. 2) to perform a propagation calculation for the selected one of segments 78. The product of the propagation calculation may be a received signal strength of radio wave 22 at the selected one of segments 78 using flat-earth propagation model 64. Following task 160, query task 156 is performed (discussed below).

Referring back to query task 144, when processor 38 determines that the first switching parameter, $P_{ENV2}$, does not exceed the first switching threshold, $T_{ENV2}$, program control proceeds to a query task-162. That is, a negative response at query task 144 indicates that the second propagation environment, i.e., water environment 32, is not exerting a greater influence on the propagation of radio wave 22 (FIG. 2) at the selected one of segments 78. However, if program control proceeded to query task 144 via task 142, it is still unknown as to which of the first and third propagation environments is exerting a greater influence on the propagation of radio wave 22 at the select one of segments 78.

Figure 8:
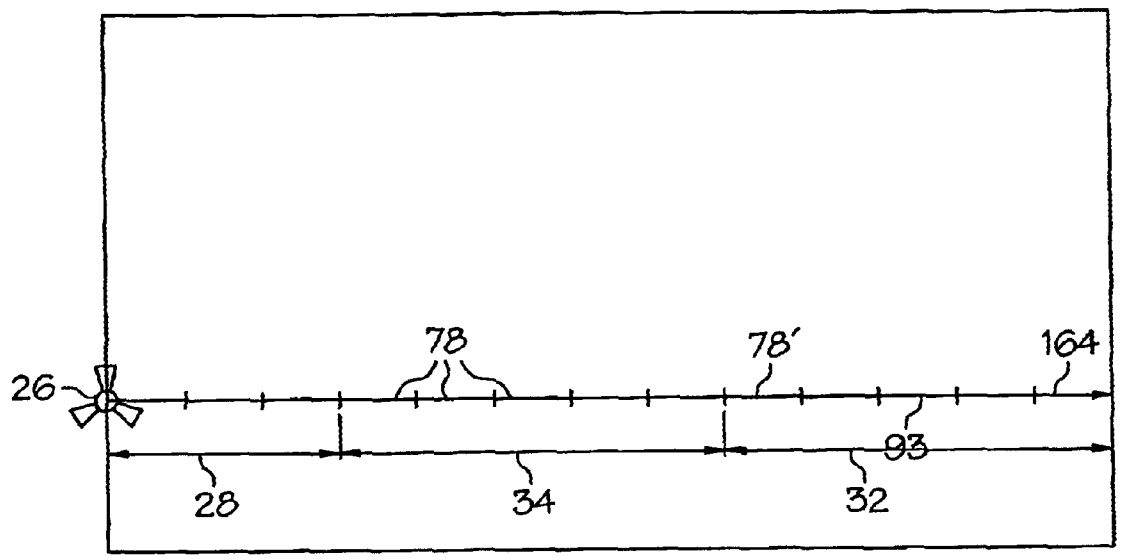
FIG. 8 shows a third radial emanating from the base station of FIG. 1 and traversing a clutter-based environment, a rugged terrain environment, and a flat-earth environment.

With reference to FIG. 8 in connection with task 144, FIG. 8 shows a third radial 164 emanating from base station 26 and traversing a clutter-based environment, i.e., urban environment 28, rugged terrain environment 34, and a flat-earth environment, i.e., water environment 32. Third radial 164 illustrates a scenario in which the propagation environment at a selected one of segments 78, represented by a segment 78', is ascertained to be the second propagation environment at task 138 (FIG. 7). Accordingly, the first switching parameter, $P_{ENV2}$, is obtained at task 142 (FIG. 7).

Following task 142, task 144 determines if the first switching parameter, $P_{ENV2}$ is greater than the first switching threshold, $T_{ENV2}$. Since, segment 78' is the first one of segments along third radial 164 to traverse the second propagation environment, i.e., water environment 32, a response to task 144 will be negative and program control proceeds to query task 162.

In the example shown in FIG. 8, query task 162 determines that the second switching parameter, $P_{ENV3}$, is greater than or equal to the second switching threshold, $T_{ENV3}$. That is, since segment 78' is the first segment traversing the second propagation environment, (water environment 32) after a series of mostly segments 78 traversing the third propagation environment (rugged terrain environment 34), rugged terrain environment 34 will still exert a greater influence on the propagation of radio wave 22 (FIG. 1) along third radial 164 than water environment 32. An affirmative response to query task 162 causes program control to proceed to tasks 152 and 154 to choose and employ the third propagation model, i.e., rugged terrain model 66 (FIG. 2) to perform a propagation calculation for segment 78'.

Referring back to query task 162 (FIG. 7), when processor 38 determines that the second switching parameter, $P_{ENV3}$, does not exceed the second switching threshold, $T_{ENV3}$, program control proceeds to a task 166. That is, a negative response at query task 162 verifies that the first propagation environment, i.e., urban environment 28, is exerting a greater influence on the propagation of radio wave 22 (FIG. 2) at the selected one of segments 78 than both of the second and third propagation environments.

Task 166 is similar to tasks 152 and 158 in that task 166 causes processor 38 to choose a first propagation model, such as clutter-based land model 62 (FIG. 2) to predict propagation of radio wave 22 from base station 26 (FIG. 1) through the selected one of segments 78.

A task 168 is performed in response to task 166. Task 168 is similar to tasks 154 and 160 in that task 168 causes processor 38 to utilize the first propagation model, i.e., clutter-based land model 64 (FIG. 2), recorded on computer readable storage medium 44 (FIG. 2) to perform a propagation calculation for the selected one of segments 78. Accordingly, the first propagation model is utilized when both the first and second switching parameters (i.e., $P_{ENV2}$ and $P_{ENV3}$) fail to exceed their respective first and second switching thresholds (i.e. $T_{ENV2}$ and $T_{ENV3}$). The product of the propagation calculation may be a received signal strength of radio wave 22 at the selected one of segments 78 using clutter-based land model 64. Following task 168, query task 156 is performed.

Accordingly, query task 156 is performed following the execution of any of calculation tasks 154, 160, and 168. Query task 156 is performed following any of tasks 154, 160, and 164 to determine if the segment count, I, associated with the selected one of segments 78 (FIG. 4) is less than a total number of segments, $I_{TOTAL}$, that form the selected one of radials 24. When processor 38 determines at query task 156 that the segment count, I, is less than the segment total, $I_{TOTAL}$, program control loops back to task 136 to select the next one of segments 78 and to perform a propagation calculation for the next consecutive one of segments 78 using one of the first, second, and third propagation models.

However, when processor 38 determines at query task 156 that the segment count, I, is not less than the total number of segments, $I_{TOTAL}$, process 58 proceeds to a query task 170. Accordingly, a negative response to query task 156 indicates that a propagation calculation was performed for each of segments 78 along the selected one of radials 24 (FIG. 1).

At query task 170, processor 38 (FIG. 2) determines if there is another one of radials 24 for which propagation prediction process 130 is to be performed. When there is another one of radials 24, program control loops back to task 132 to select the next one of radials 24, and perform propagation calculations for each of segments 78 defining the next one of radials 24 using one of the first, second, and third propagation models.

However, when query task 170 determines that there is not another one of radials 24, process 130 exits having performed propagation calculations on a segment by segment, and radial by radial basis, using propagation models best suited to the propagation environments through which each segment traverses.

In summary, the present invention teaches of a method and system for predicting radio wave propagation. Radio wave propagation is predicted along radials emanating from a base station one a per segment basis to adapt the propagation prediction calculations to the particular propagation environment through which the segment traverses. This adaptive prediction methodology is accomplished by providing a mechanism for choosing between two or more propagation models for predicting radio wave propagation in response to a propagation environment at each segment along the radials. The selection of propagation models on a per segment basis gives rise to more accurate prediction of radio wave propagation, thereby making better network planning possible.

Although the preferred embodiments of the invention have been illustrated and described in detail, it will be readily apparent to those skilled in the art that various modifications may be made therein without departing from the spirit of the invention or from the scope of the appended claims. For example, the present invention was described in terms of choosing between two propagation models and choosing between three propagation models. However, any number of propagation models could employed. In addition, the present invention was described in terms of particular propagation models and specific land use categories, or propagation environments. However, the land use categorization and the particular propagation models to be utilized are user dependent and can be varied as desired by the network designer. Furthermore, those skilled in the art will appreciate that the present invention will accommodate a wide variation in the specific tasks and the specific task ordering used to accomplish the processes described herein.

What is claimed is:

1. A computer-based method for predicting radio wave propagation along a radial emanating from a base station comprising:

selecting one segment from a plurality of segments describing said radial;

ascertaining a propagation environment through which said one segment traverses, said propagation environment being one of a first propagation environment and a second propagation environment;

obtaining a switching parameter relative to said second propagation environment;

utilizing a first propagation model to predict said radio wave propagation at said one segment when said switching parameter fails to exceed a threshold; and employing a second propagation model to predict said radio wave propagation at said one segment when said switching parameter exceeds said threshold.

2. A computer-based method as claimed in claim 1 wherein prior to said selecting operation said method further comprises partitioning said radial into said plurality of segments, each of said segments having a common length.

3. A computer-based method as claimed in claim 1 wherein:

said ascertaining operation identifies said first propagation environment as a clutter-based environment and said second propagation environment as a flat-earth environment;

said utilizing operation utilizes a clutter-based land propagation model for said first propagation model; and said employing operation employs a flat-earth propagation model for said second propagation model.

4. A computer-based method as claimed in claim 1 wherein said obtaining operation comprises:

computing a length of said radial from said base station through said one segment; and determining said switching parameter to be a proportion of said length through which said radial traverses said second propagation environment.

5. A computer-based method as claimed in claim 4 wherein:

said computing operation includes summing a total quantity of said segments between said base station through said one segment; and said determining operation includes:

identifying a portion of said segments traversing said second propagation environment from said total quantity; and computing a ratio of said portion to said total quantity to obtain said switching parameter.

6. A computer-based method as claimed in claim 1 further comprising defining said threshold to be a value at which said second propagation environment exerts a greater influence on said radio wave propagation than said first propagation environment.

7. A computer-based method as claimed in claim 6 wherein:

said second propagation environment is a flat-earth environment; and said defining operation defines said value to be a proportion of a quantity of said segments along a length of said radial traversing said flat-earth environment relative to a total quantity of said segments along said length.

8. A computer-based method as claimed in claim 6 wherein:

said second propagation environment is a rugged-terrain environment; and said defining operation defines said value to be an effective antenna height.

9. A computer-based method as claimed in claim 1 wherein said switching parameter is a first switching parameter, said threshold is a first threshold, and said method further comprises:

determining said propagation environment through which said one segment traverses is a third propagation environment;

obtaining a second switching parameter relative to said third propagation environment; and employing a third propagation model to predict said radio wave propagation at said one segment when said second switching parameter exceeds a second threshold.

10. A computer-based method as claimed in claim 1 wherein said utilizing operation utilizes said first propagation model to predict said radio wave propagation when said second switching parameter fails to exceed said second threshold.

11. A computer-based method as claimed in claim 1 wherein said method is performed for each of said segments of said plurality of segments in a consecutive segment order from said base station.

12. A computer-based method as claimed in claim 1 further comprising:

defining a plurality of radials emanating from said base station, said radial being one of said plurality of radials; and performing said operations for each of said radials to predict said radio wave propagation along said each radial.

13. A computing system for predicting radio wave propagation from a base station, said computing system comprising:

a processor;

a computer-readable storage medium; and executable code recorded on said computer-readable storage medium for instructing said processor to perform operations comprising:

defining a plurality of radials emanating from said base station;

for each of said radials, selecting one segment from a plurality of segments describing said radial;

ascertaining a propagation environment through which said one segment traverses, said propagation environment being one of a clutter-based environment and a flat-earth environment;

obtaining a switching parameter relative to said flat-earth environment;

utilizing a clutter-based land propagation model to predict said radio wave propagation at said one segment when said switching parameter fails to exceed a threshold; and employing a flat-earth propagation model to predict said radio wave propagation at said one segment when said switching parameter exceeds said threshold.

14. A computing system as claimed in claim 13 wherein said selecting, ascertaining, and obtaining operations are performed for each of said segments of said plurality of segments in a consecutive segment order from said base station.

15. A computing system as claimed in claim 13 wherein said executable code further instructs said processor to define a value of said threshold to be a proportion of a quantity of said segments along a length of said radial traversing said flat-earth environment relative to a total quantity of said segments along said length.

16. A computer-readable storage medium containing executable code for instructing a processor to choose one of a first propagation model and a second propagation model for predicting radio wave propagation along a radial emanating from a base station, said executable code instructing said processor to perform operations comprising:

selecting one segment from a plurality of segments describing said radial;

ascertaining a propagation environment through which said one segment traverses, said propagation environment being one of a first propagation environment and a second propagation environment;

defining a threshold at which said second propagation environment exerts a greater influence on said radio wave propagation than said first propagation environment;

obtaining a switching parameter relative to said second propagation environment;

choosing said first propagation model to predict said radio wave propagation at said one segment when said switching parameter fails to exceed said threshold; and choosing said second propagation model to predict said radio wave propagation at said one segment when said switching parameter exceeds said threshold.

17. A computer-readable storage medium as claimed in claim 16 wherein said executable code instructs said processor to perform a further operation prior to said selecting operation comprising partitioning said radial into said plurality of segments, each of said segments having a common length.

18. A computer-readable storage medium as claimed in claim 16 wherein said executable code instructs said processor to perform further operations comprising:

computing a length of said radial from said base station through said one segment;

determining a proportion of said length through which said radial traverses said second propagation environment to obtain said switching parameter.

19. A computer-readable storage medium as claimed in claim 16 wherein said switching parameter is a first switching parameter, said threshold is a first threshold, and said executable code instructs said processor to perform further operations comprising:

determining said propagation environment through which said one segment traverses is a third propagation environment;

obtaining a second switching parameter relative to said third propagation environment; and choosing a third propagation model to predict said radio wave propagation at said one segment when said second switching parameter exceeds a second threshold.

20. A computer-readable storage medium as claimed in claim 19 wherein said executable code instructs said processor to perform further operations comprising:

employing said second propagation model to predict said radio wave propagation at said one segment when said first switching parameter exceeds said first threshold;

employing said third propagation model to predict said radio wave propagation at said one segment when said second switching parameter exceeds said second threshold; and utilizing said first propagation model to predict said radio wave propagation when said first switching parameter fails to exceed said first threshold and when said second switching parameter fails to exceed said second threshold.

* * * * *